United States Patent
Kim et al.

(10) Patent No.: US 7,010,322 B2
(45) Date of Patent: Mar. 7, 2006

(54) APPARATUS AND METHOD FOR CONTROLLING POWER OF A FORWARD COMMON POWER CONTROL CHANNEL IN A MOBILE COMMUNICATION SYSTEM

(75) Inventors: Youn-Sun Kim, Seoul (KR); Jae-Sung Jang, Kwachon-shi (KR); Ho-Kyu Choi, Songnam-shi (KR); Hwan-Joon Kwon, Seoul (KR)

(73) Assignee: Samsung Electronics Co., Ltd., (KR)

( * ) Notice: Subject to any disclaimer, the term of this patent is extended or adjusted under 35 U.S.C. 154(b) by 416 days.

(21) Appl. No.: 10/281,498

(22) Filed: Oct. 28, 2002

(65) Prior Publication Data

US 2003/0083092 A1 May 1, 2003

(30) Foreign Application Priority Data

Oct. 29, 2001 (KR) .................. P10-2001-0066898

(51) Int. Cl.
*H04Q 7/20* (2006.01)
(52) U.S. Cl. ............... 455/522; 455/69; 455/127.1; 370/342
(58) Field of Classification Search ........... 455/522, 455/69, 442, 453, 127.1, 67.11, 226.1; 370/331, 370/442
See application file for complete search history.

(56) References Cited

U.S. PATENT DOCUMENTS 6,304,562 B1 * 10/2001 Kim et al. .................. 370/332
6,434,367 B1 * 8/2002 Kumar et al. ................ 455/70

* cited by examiner

Primary Examiner—Tilahun Gesesse
(74) Attorney, Agent, or Firm—Dilworth & Barrese LLP

(57) ABSTRACT

A method for controlling power of common power control channels from a plurality of base stations in order to control transmission power of a mobile station in a mobile communication system. The power control method comprises receiving, by the mobile station, pilot signals from the base stations and selecting a base station that transmitted a pilot signal having a highest power level; transmitting information indicating a channel condition between the selected base station and the mobile station, from the mobile station to the selected base station; and controlling power of a common power control channel transmitted from the selected base station to the mobile based on the channel condition information received from the selected base station.

11 Claims, 8 Drawing Sheets

APPARATUS AND METHOD FOR CONTROLLING POWER OF A FORWARD COMMON POWER CONTROL CHANNEL IN A MOBILE COMMUNICATION SYSTEM

PRIORITY

This application claims priority to an application entitled "Apparatus and Method for Controlling Power of Forward Common Power Control Channel in a Mobile Communication System" filed in the Korean Industrial Property Office on Oct. 29, 2001 and assigned Serial No. 2001-66898, the contents of which are hereby incorporated by reference.

BACKGROUND OF THE INVENTION

1. Field of the Invention

The present invention relates generally to a mobile communication system supporting a multimedia service including voice and data services, and in particular, to an apparatus and method for controlling power of a forward common power control channel.

2. Description of the Related Art

An IS-2000 CDMA (Code Division Multiple Access) mobile communication system, a typical mobile communication system, supports only a voice service. However, with the development of the communication technology and at the request of users, research has been carried out on a mobile communication system for supporting a data service. For example, an HDR (High Data Rate) communication system has been proposed to support only a high-speed data service.

The existing mobile communication systems are classified into one mobile communication system for supporting only the voice service and another mobile communication system for supporting only the data service. That is, although the mobile communication system is required to support both the voice service and the data service, the conventional mobile communication system is designed to support only the voice service or the data service. Therefore, there have been long demands for a mobile communication system capable of supporting both the voice service and the data service. To meet the demands, a 1×EV-DV (Evolution Data and Voice) mobile communication system has been proposed recently.

FIG. 1 illustrates forward and reverse power control-related channels in a conventional 1×EV-DV mobile communication system. Referring to FIG. 1, sectors (or base stations) #1 and #2 each measure a reverse pilot channel (R-PICH) from a mobile (or Mobile Station (MS)) to estimate a signal-to-noise ratio Ep/Nt, and compare the signal-to-noise ratio with a reference value for outer loop power control (or outer loop set point). If the estimated signal-to-noise ratio is larger than or equal to the reference value, the base stations send power-down commands to the mobile over a forward common power control channel (F-CPCCH). Otherwise, if the estimated signal-to-noise ratio is lower than the reference value, the base stations send power-up commands to the mobile over the forward common power control channel.

A soft handoff performed by the mobile is illustrated in FIG. 1. During a soft handoff, the mobile receives forward common power control channels CPCCH1 and CPCCH2 from two or more sectors #1 and #2. If at least one of the received CPCCHs includes a power-down command, the mobile decreases its transmission power. However, the mobile increases its transmission power, only when power-up commands are provided from all sectors.

In FIG. 1, transmission power of the F-CPCCH is controlled through a channel quality indicator channel (CQICH) transmitted over a reverse link. The CQICH transmits a carrier-to-interference ratio (C/I) value of a common pilot channel, measured by the mobile for a specific sector, to the sector. In general, the CQICH is used by the mobile to measure forward common pilot channels transmitted from a plurality of sectors neighboring to the mobile, and transmit a C/I value (or a forward channel condition information) of a best sector having the highest C/I value among the measured common pilot channels to the corresponding sector. Upon receiving the CQICH, the sector determines power to be allocated to the CPCCH based on the C/I value of the forward common pilot channel measured by the mobile.

When forward and reverse power control is performed during the soft handoff illustrated in FIG. 1, certain problems may occur. That is, a forward power control problem for the two or more CPCCHs may occur. The mobile in a soft handoff state is provided with CPCCHs transmitted from two or more sectors.

To better illustrate this problem, during the soft handoff, although the CPCCHs are transmitted to the mobile from two or more sectors, the mobile measures a common pilot channel from only one sector, and transmits the measurement result over the CQICH. If it is assumed in FIG. 1 that the mobile performs a soft handoff between two sectors #1 and #2, and that the sector #1 has a better forward channel environment than the sector #2, then the CQICH of the mobile transmits a measured value of only the common pilot channel from the sector #1 to the sector #1, a best sector. Then, the sector #1, the best sector, receives the CQICH from the mobile, and determines transmission power of CPCCH to be transmitted based on a C/I value of a forward channel included in the received CQICH. However, since the sector #2 has a worse forward channel environment than the sector #1, the CQICH has no C/I value of the forward channel to be used when determining transmission power of the CPCCH.

In addition, if an erasure process occurs because reception power of the CQICH is lower than a predetermined threshold, regardless of the soft handoff, the base station cannot determine transmission power of CPCCH symbols to be allocated to the mobile.

SUMMARY OF THE INVENTION

It is, therefore, an object of the present invention to provide an apparatus and method for controlling power of a forward common power control channel (CPCCH) transmitting a power control command for controlling power of a reverse link in a mobile communication system.

To achieve the above and other objects, the present invention provides a method for controlling power of common power control channels from a plurality of base stations in order to control transmission power of a mobile station in a mobile communication system including the mobile station and the base stations constituting an active set for a handoff.

According to a first aspect of the present invention, the power control method comprises: receiving, by the mobile station, pilot signals from the base stations and selecting a base station that transmitted a pilot signal having the highest power level; transmitting information indicating a channel condition between the selected base station and the mobile station, from the mobile station to the selected base station;

and controlling power of a common power control channel transmitted from the selected base station to the mobile based on the channel condition information received from the selected base station.

Further, the power control method comprises: determining a power control bit according to state information received from the base stations, and transmitting the determined power control bit to the base stations; and controlling, by the non-selected base stations, power of the common power control channels transmitted from non-selected base stations to the mobile station based on the received power control bits.

According to a second aspect of the present invention, the power control method comprises: receiving, by the mobile station, pilot signals from the base stations and selecting a base station that transmitted a pilot signal having the highest power level; transmitting information indicating a channel condition between the selected base station and the mobile station, from the mobile station to the selected base station over a channel quality indicator channel, determining a power control bit according to state information received from the base stations, and transmitting the determined power control bit to the base stations over a pilot channel; receiving, by the base stations, a channel quality indicator channel and a pilot channel from the mobile station; measuring power of the received channel quality indicator channel by the base stations; controlling, by the selected base station, power of a common power control channel transmitted from the selected base station to the mobile station based on the channel condition information received over the channel quality indicator channel, if the measured power is higher than or equal to a predetermined threshold; and controlling, by the selected base station, power of the common power control channel transmitted from the selected base station to the mobile station based on the power control bit received over the pilot channel, if the measured power is lower than the predetermined threshold.

Further, the power control information comprises controlling, by the non-selected base station, power of common power control channels transmitted from the non-selected base stations to the mobile station based on the received power control bits.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, an F-CPCCH (Forward Common Power Control Channel) and a CQICH (Channel Quality Indicator Channel) are transmitted in forward and reverse directions, respectively. Here, the forward direction indicates a transmission direction from a base station (or sector) to a mobile, and the reverse direction indicates a transmission direction from the mobile to the base station. The F-CPCCH is a channel for controlling reverse power of a plurality of mobiles with one code channel. The CQICH is used by the mobile to measure forward common pilot channels transmitted from neighboring sectors, and transmit a C/I (Carrier-to-Interference ratio) value indicating a received signal strength indicator of a best sector having the best forward channel, to the corresponding base station. Here, the "best sector" indicates a sector that transmitted a pilot signal having the highest power. The CQICH further includes sector indicator information indicating the best sector having the best forward channel. Upon receiving the CQICH, the best sector determines a transmission point of forward packet data, a modulation type and a code rate based on the information included in the received CQICH.

Figure 1:
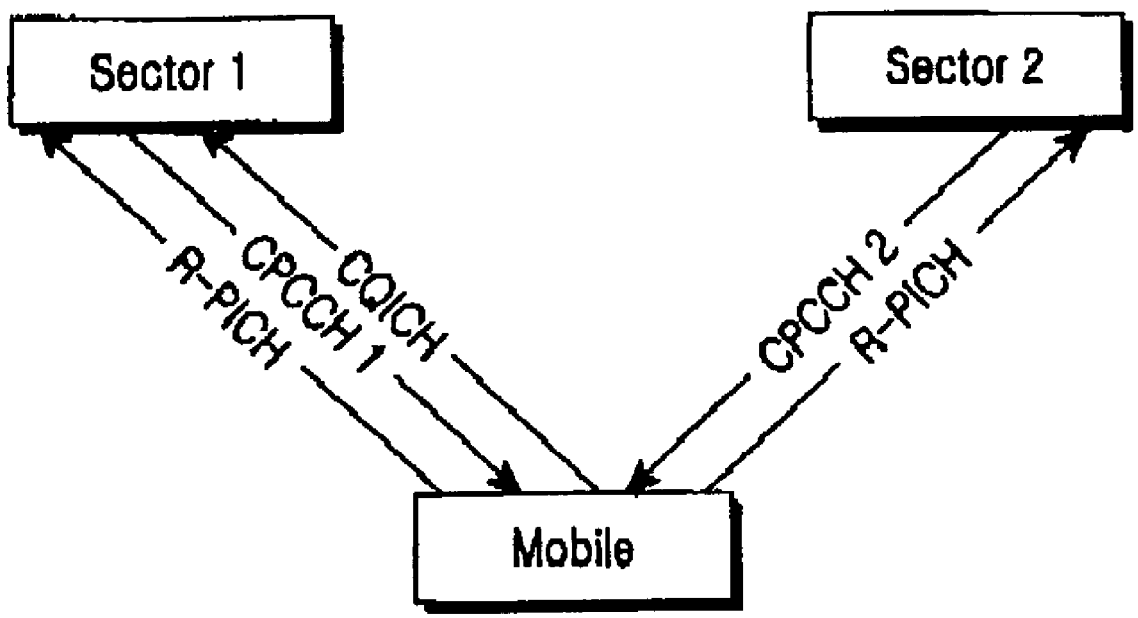
FIG. 1 illustrates forward and reverse power control-related channels in a conventional mobile communication system.
Figure 2:
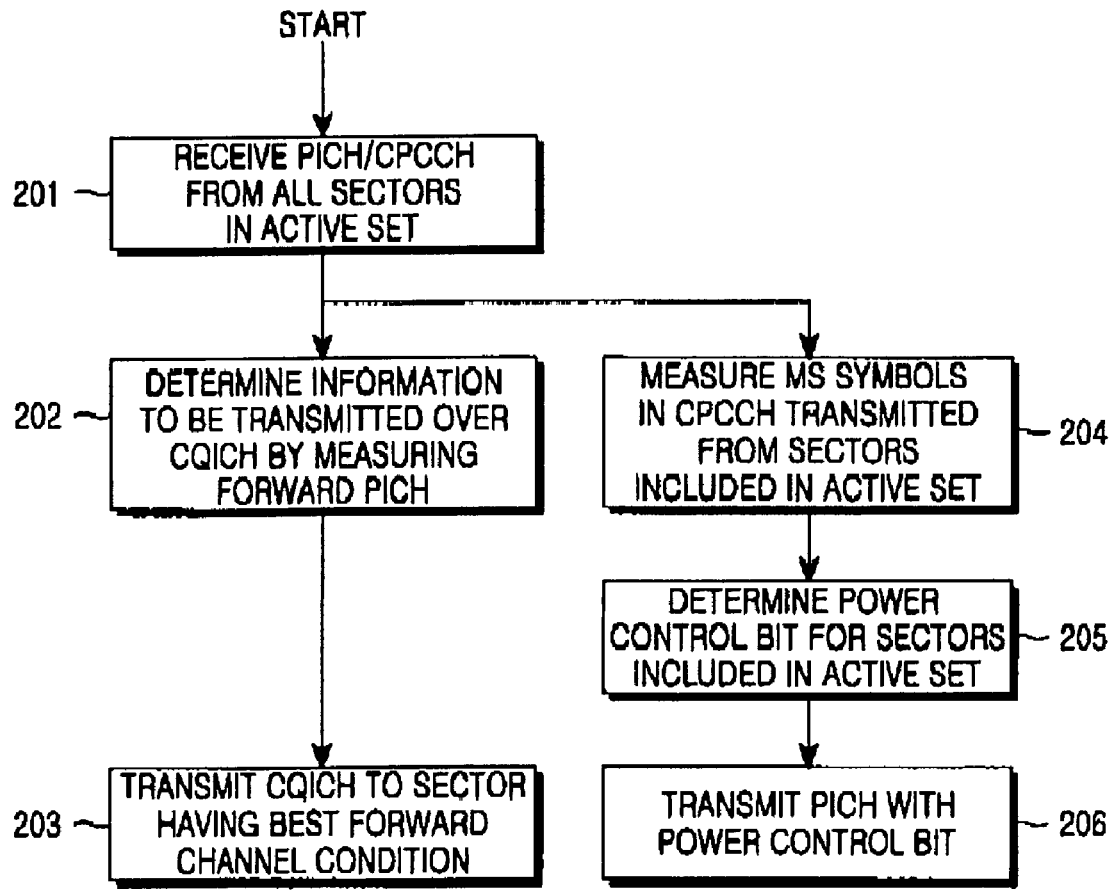
FIG. 2 illustrates a procedure for generating information for controlling transmission power of forward CPCCHs from sectors included in an active set by a mobile in a mobile communication system according to an embodiment of the present invention.

FIG. 2 illustrates a procedure for generating information for controlling transmission power of forward CPCCHs from sectors (or base stations) included in an active set by a mobile in a mobile communication system according to an embodiment of the present invention. Referring to FIG. 2, in step 201, the mobile receives forward common pilot channels (PICHs) and forward common power control channels (CPCCHs) from all sectors included in an active set. Thereafter, in step 202, the mobile measures received signal strength indicators of the forward common pilot channels received from all the sectors to detect a sector having a best forward channel condition, and determines the detected sector as a best sector. That is, the mobile determines a sector having the highest received signal strength indicator among the measured received signal strength indicators as the best sector. In addition, in step 202, the mobile determines information to be included in the CQICH to be transmitted to the best sector. As described before, information transmitted over the CQICH includes sector indicator information indicating the best sector and a received signal strength indicator (e.g., C/I) obtained by measuring the forward common pilot channel. In step 204, the mobile measures energy of CPCCH symbols (power control bits) transmitted from all sectors included in the active set. In step 205, the mobile determines power control bits (PCBs) for forward power control, to be transmitted to the sectors included in the active set, based on the measured energy values of the CPCCH symbols. There are several methods of determining the power control bits. For example, two of the methods include:

Method #1: The mobile generates a power-down command, if all CPCCH symbols received from sectors included in the active set have energy values higher than or equal to a threshold. However, if at least one of the CPCCH symbols has an energy value lower than the threshold, the mobile generates a power-up command.

Method #2: The mobile generates a power-down command, if CPCCH symbols received from sectors included in the active set have an average energy value higher than or equal to a threshold. However, if the CPCCH symbols have an average energy value lower than the threshold, the mobile generates a power-down command.

Thereafter, in step 206, the mobile transmits the determined power control bit (PCB) over a reverse pilot channel (PICH). At the same time, the mobile transmits, in step 203, a channel quality indicator channel (CQICH) with the determined sector indicator information and the determined C/I value of a forward common pilot channel (or forward channel condition information), to the determined best sector.

Figure 3:
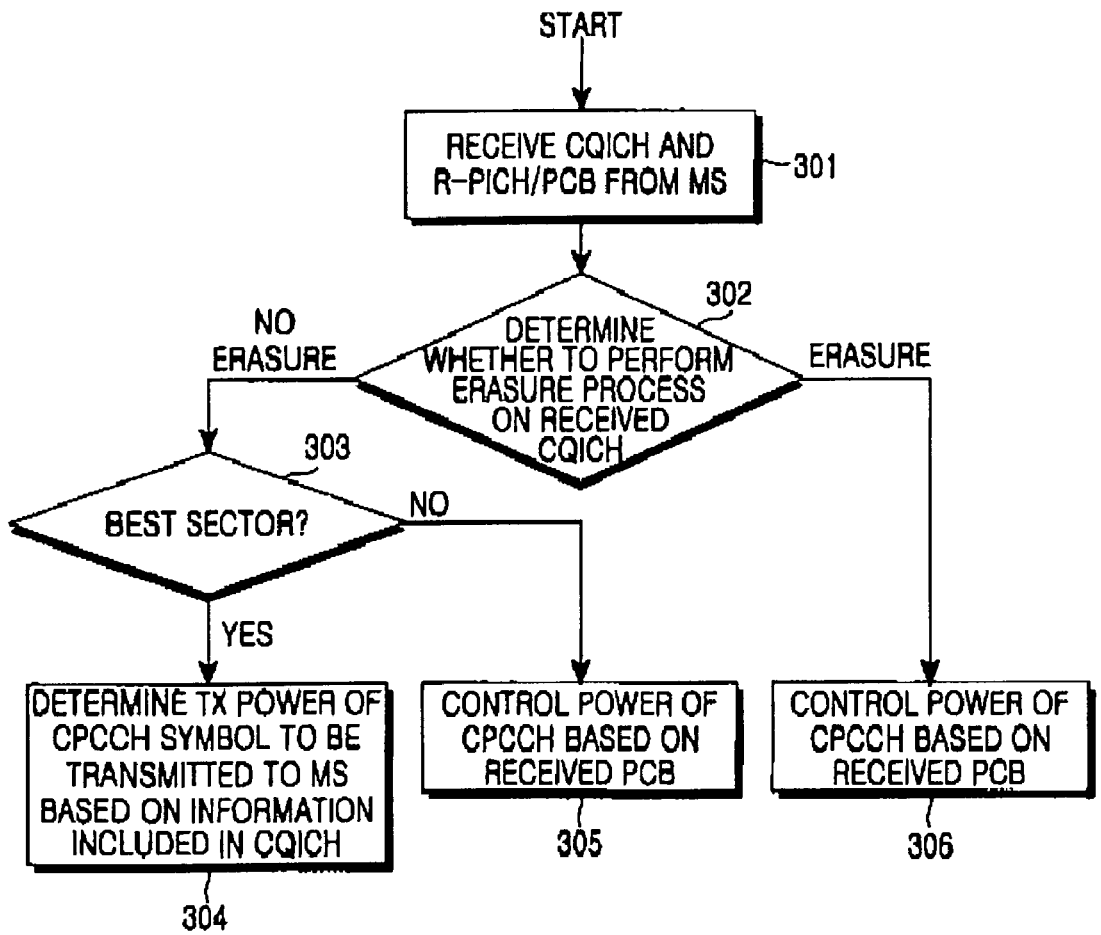
FIG. 3 illustrates a procedure for controlling transmission power of CPCCH by a sector in a mobile communication system according to an embodiment of the present invention.

FIG. 3 illustrates a procedure for controlling transmission power of a CPCCH by a sector in a mobile communication system according to an embodiment of the present invention. Referring to FIG. 3, in step 301, the sector receives CQICH and R-PICH with PCB transmitted from the mobile. Thereafter, in step 302, the sector measures power of the received CQICH, and determines whether to perform an erasure process. "Determining whether to perform an erasure process" is equivalent to measuring power of a received CQICH and determining whether to selectively erase the CQICH according to whether the measured value is larger than or equal to a threshold. That is, the sector decodes the received CQICH, only when the measured power of the CQICH is larger than or equal to the threshold. However, if the measured power of the received CQICH is smaller than the threshold, the sector performs an erasure process on the CQICH, i.e., does not decode the CQICH. The reason for determining whether to perform an erasure process is to maintain reception performance of information included in the CQICH. If it is determined in step 302 that it is not necessary to perform an erasure process, the sector decodes the received CQICH and reads information included therein. Thereafter, the sector determines in step 303 whether a best sector indicator (BSI) among the information acquired by decoding indicates the sector. If the best sector indicator indicates the sector, the sector determines, in step 304, transmission power of CPCCH based on C/I information of a forward common pilot channel, included in the CQICH. If the best sector indicator included in the CQICH does not indicate the sector in step 303, the sector proceeds to step 305 where it controls transmission power of CPCCH according to a power control bit received along with a reverse pilot channel (R-PICH).

However, if it is determined in step 302 that it is necessary to perform an erasure process on the received CQICH, i.e., if the measured power of the received CQICH is smaller than the threshold, then in step 306, the sector controls transmission power of a CPCCH according to a PCB received along with an R-PICH as described in conjunction with step 305, without decoding the received CQICH.

Figure 4:
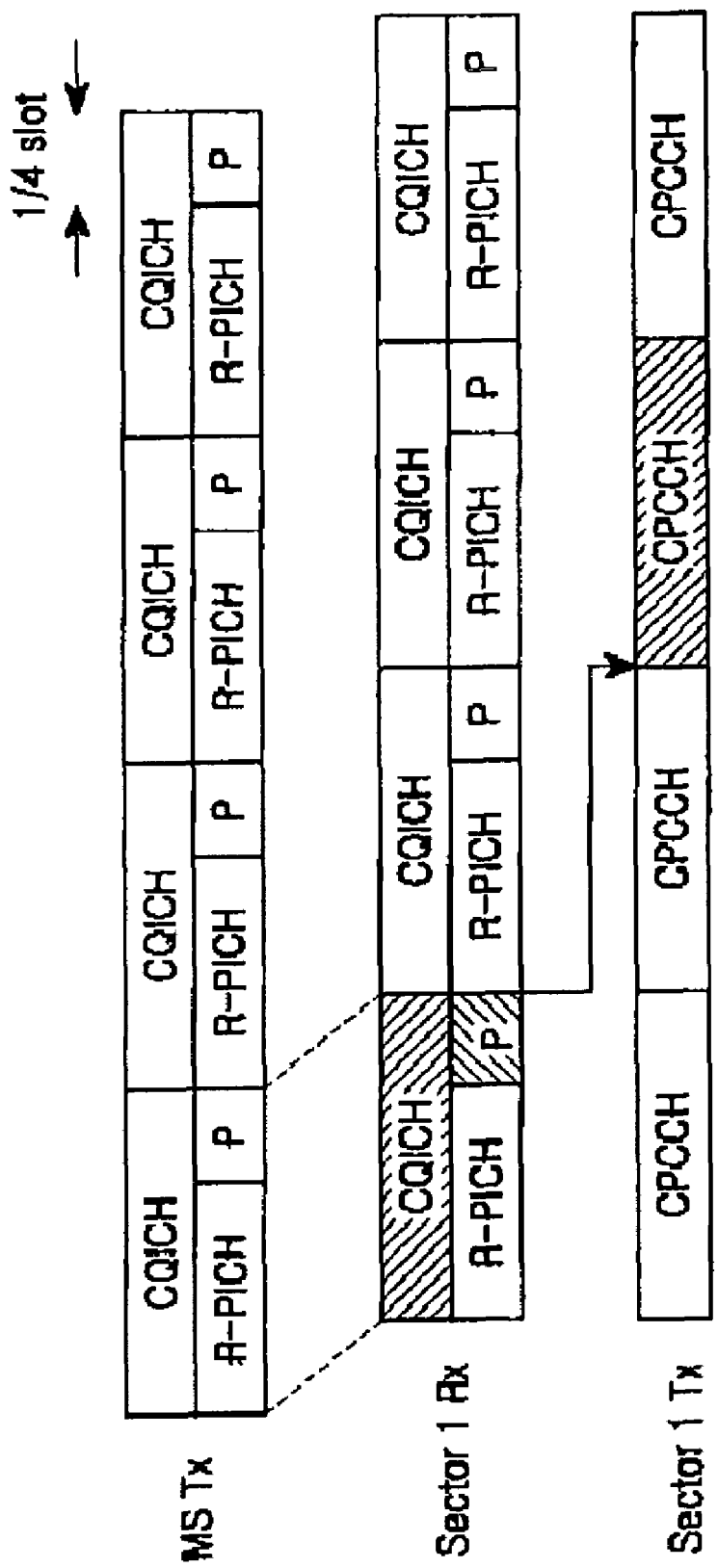
FIG. 4 illustrates a timing operation of channels for controlling transmission power of a forward CPCCH in a mobile communication system according to an embodiment of the present invention.

FIG. 4 illustrates a timing operation of channels for controlling transmission power of a forward CPCCH in a mobile communication system according to an embodiment of the present invention. Specifically, FIG. 4 illustrates an operation for exchanging signals between one mobile and one sector, wherein the mobile does not perform a soft handoff. Here, the mobile transmits a CQICH and an R-PICH in a slot unit (or on a slot-by-slot basis), and the R-PICH includes a PCB in ¼ slot thereof and one slot is 1.25 ms.

Referring to FIG. 4, the mobile (or mobile station (MS)) transmits a PICH and a CQICH to the sector over all of the slots. A traffic channel transmitting traffic data, if it has data to be transmitted to the sector, is transmitted along with the PICH and the CQICH. Transmitting the CQICH to a specific sector is equivalent to measuring a C/I of the corresponding sector and controlling transmission power so that the corresponding sector can receive the measured C/I at a specified reception performance. A method of controlling transmission power of an F-CPCCH will be described herein below.

In FIG. 4, the reverse CQICH transmits a forward C/I value of a sector #1 and sector indicator information indicating the sector #1 as a best sector. In addition, a part of the R-PICH is used to transmit a PCB (represented by P) for power control of a forward channel. Upon receiving the reverse CQICH and R-PICH from the mobile, the sector #1 determines, as described in step 302 of FIG. 3, whether to perform an erasure process, based on the received CQICH. If the measured power of the received CQICH is larger than or equal to a threshold, making it unnecessary to perform the erasure process, then the sector #1 determines, as described in step 303 of FIG. 3, whether the best sector indicator included in the CQICH indicates the sector #1. If the best sector indicator indicates the sector #1, the sector #1 controls transmission power of a CPCCH based on the forward C/I value. Otherwise, if the best sector indicator does not indicate the sector #1, the sector #1 controls transmission power of the CPCCH according to the received PCB. Meanwhile, if it is determined to perform an erasure process, the sector #1 controls transmission power of the CPCCH according to the received PCB, as described in step 306 of FIG. 3. That is, if the sector indicator information in the CQICH indicates the sector #1, the sector #1 controls transmission power of the forward CPCCH based on the C/I of a forward common pilot channel, included in the CQICH. However, if the measured power of the received CQICH is smaller than a threshold or the sector indicator information in the CQICH does not indicate the sector #1, the sector #1 controls transmission power of the forward CPCCH based on the PCB in the R-PICH.

In brief, FIG. 4 illustrates a method of controlling transmission power of a CPCCH according to a forward C/I value included in a reverse CQICH or a received PCB occupying a part of a R-PICH based on the procedure illustrated in FIG. 3.

Figure 5:
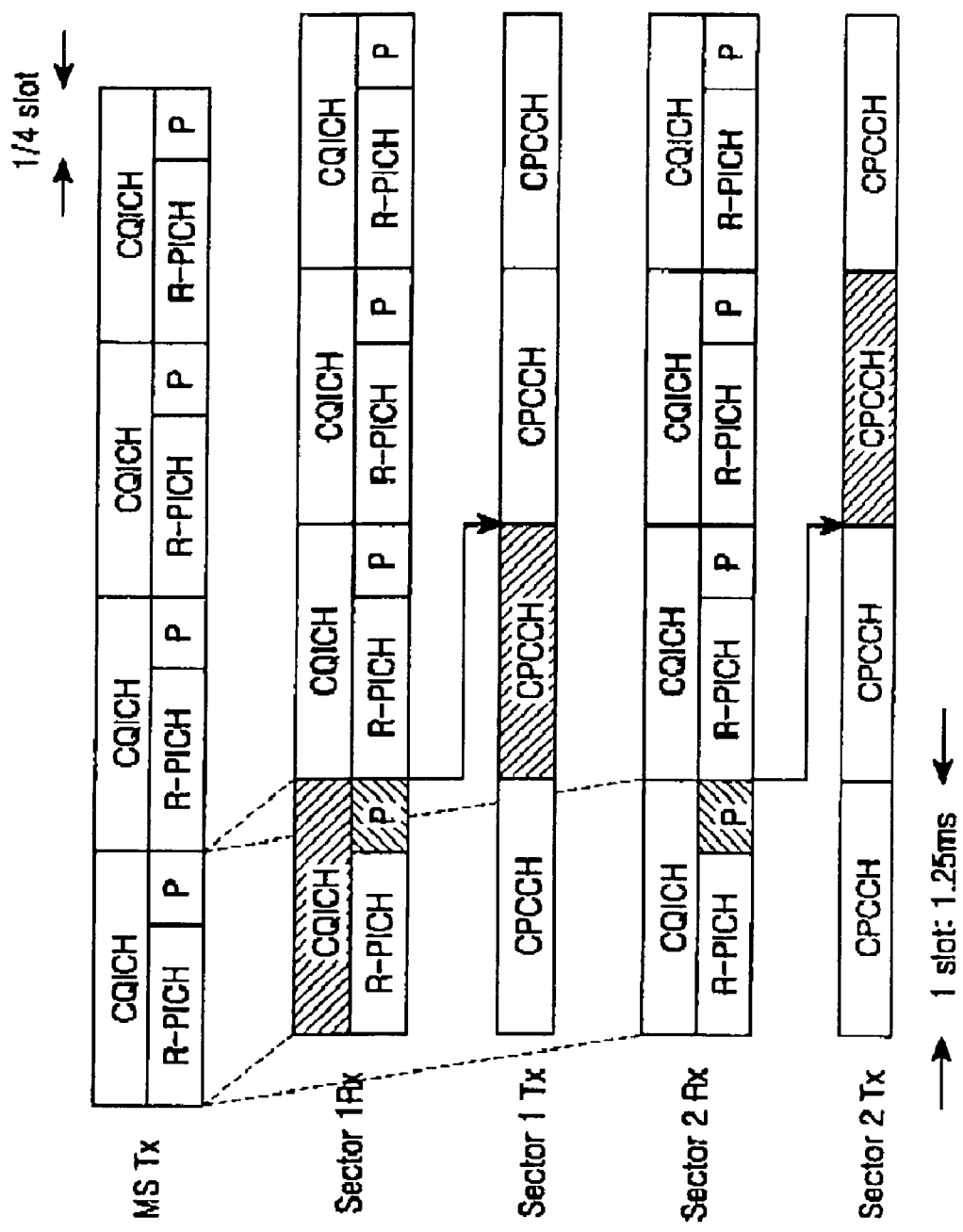
FIG. 5 illustrates a timing operation of channels for controlling transmission power of a forward CPCCH during a soft handoff in a mobile communication system according to an embodiment of the present invention.

FIG. 5 illustrates a timing operation of channels for controlling transmission power of a forward CPCCH during a soft handoff in a mobile communication system according to another embodiment of the present invention. Specifically, FIG. 5 illustrates an operation for exchanging signals between one mobile and two sectors, wherein the mobile performs a soft handoff between the two sectors. Here, the mobile transmits a CQICH and an R-PICH in a slot unit, and the R-PICH includes a PCB in ¼ slot thereof and one slot is 1.25 ms.

Referring to FIG. 5, the mobile transmits a PICH and a CQICH to the sectors over all of the slots. A traffic channel transmitting traffic data, if it has data to be transmitted to the sectors, is transmitted along with the PICH and the CQICH. Transmitting the CQICH to a specific sector is equivalent to measuring a forward C/I value of the sectors included in the active set and controlling transmission power so that the corresponding sector can receive the measured forward C/I value of the best sector having the best forward channel condition at specified reception performance. A method of controlling transmission power of F-CPCCH will be described herein below.

It will be assumed in FIG. 5 that the mobile includes a sector #1 and a sector #2 in its active set, and indicates the sector #1 as a best sector. Therefore, in FIG. 5, the reverse CQICH transmits a forward C/I value of the sector #1 and sector indicator information indicating the sector #1 as a best sector. In addition, a part of the R-PICH is used to transmit a PCB for power control of a forward channel. Upon receiving the reverse CQICH and the R-PICH from the mobile, the sector #1 determines, as described in step 302 of FIG. 3, whether to perform an erasure process, based on the received CQICH. If it is determined not to perform the erasure process, then the sector #1 determines, as described in step 303 of FIG. 3, whether the best sector indicator included in the CQICH indicates the sector #1. Here, since the best sector indicator in the CQICH indicates the sector #1, the sector #1 controls transmission power of the CPCCH based on the forward C/I value included in the received CQICH. Otherwise, if it is determined to perform an erasure process, the sector #1 controls transmission power of the CPCCH according to the PCB on the received R-PICH, as described in step 306 of FIG. 3.

Meanwhile, the sector #2 also determines, as described in step 302 of FIG. 3, whether to perform an erasure process, based on the measured power of the received CQICH. If it is determined not to perform the erasure process, then the sector #2 determines, as described in step 303 of FIG. 3, whether the best sector indicator included in the CQICH indicates the sector #2. Here, since the best sector indicator in the CQICH indicates the sector #1, the sector #2 controls transmission power of the CPCCH according to the PCB on the received R-PICH, as described in step 306 of FIG. 3. That is, since the sector #2 is not a best sector, although it is determined not to perform an erasure process, the sector #2 controls transmission power of the CPCCH according to the PCB on the assumption that the sector indicator information in the CQICH would not indicate the sector #2.

In brief, FIG. 5 illustrates a method of controlling transmission power of a CPCCH being transmitted to a mobile in a soft handoff state according to a forward C/I value included in a reverse CQICH or a received PCB occupying a part of an R-PICH based on the procedure illustrated in FIG. 3.

Figure 6:
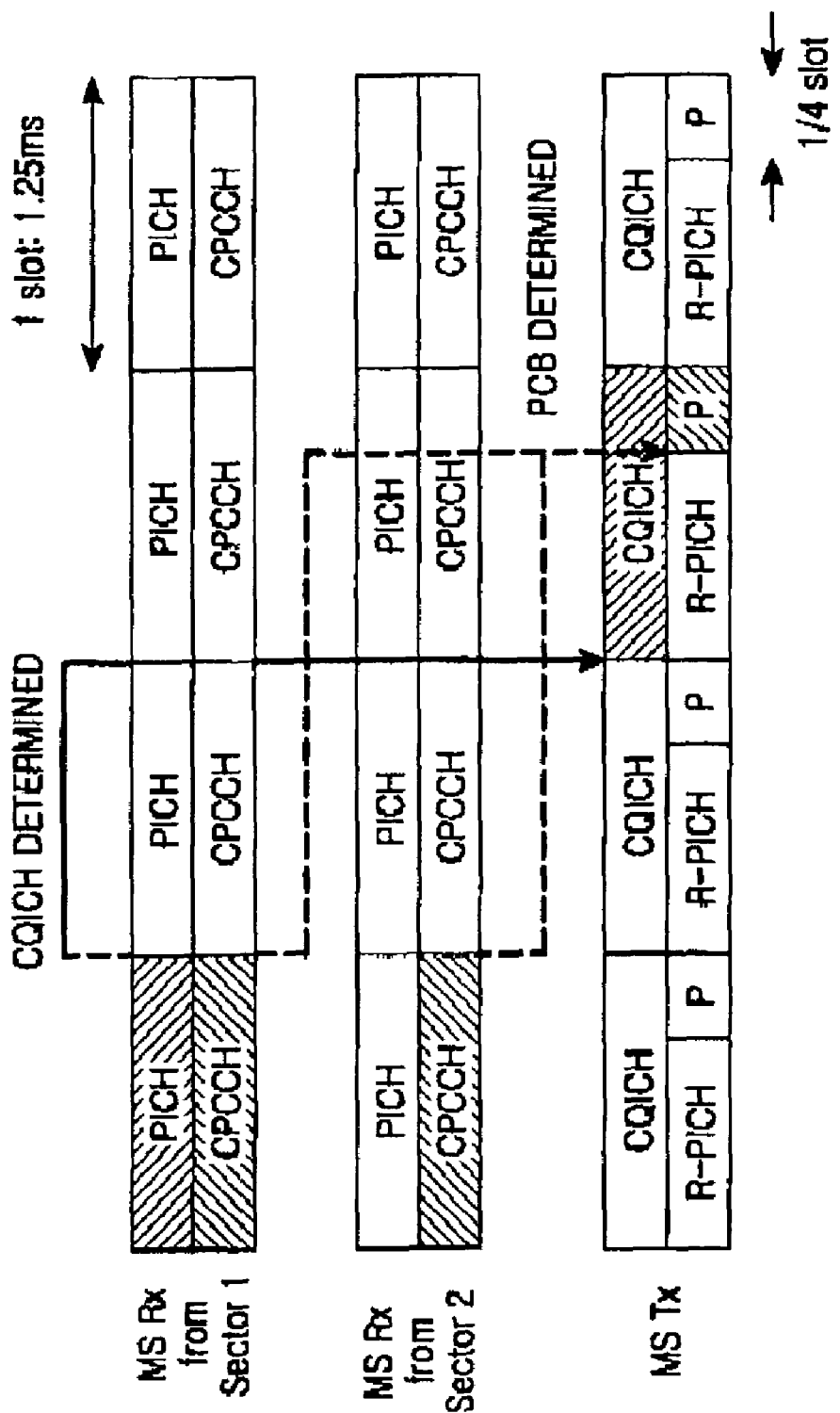
FIG. 6 illustrates a timing operation of channels for controlling transmission power of a forward CPCCH from the viewpoint of a mobile in a mobile communication system according to an embodiment of the present invention.

FIG. 6 illustrates a timing operation of channels for controlling transmission power of a forward CPCCH from a viewpoint of a mobile in a mobile communication system according to an embodiment of the present invention. Referring to FIG. 6, the mobile receives forward common pilot channels and CPCCHs from all sectors included in the active set. That is, the mobile receives forward common pilot channels and CPCCHs transmitted by the sector #1, a best sector, and other sectors included in the active set. The mobile measures a C/I value of a signal received over the forward common pilot channel from the best sector, and transmits the measured C/I value to the corresponding sector. In addition, the mobile measures power of the CPCCH symbols received from the sector #1 and the sector #2, and determines a PCB that can be commonly applied to the sector #1 and the sector #2, based on the measured power. Although two sectors are included in the active set in the case illustrated in FIGS. 5 and 6, the invention can be equally applied even when the number of sectors included in the active set is greater than 2.

Figure 7:
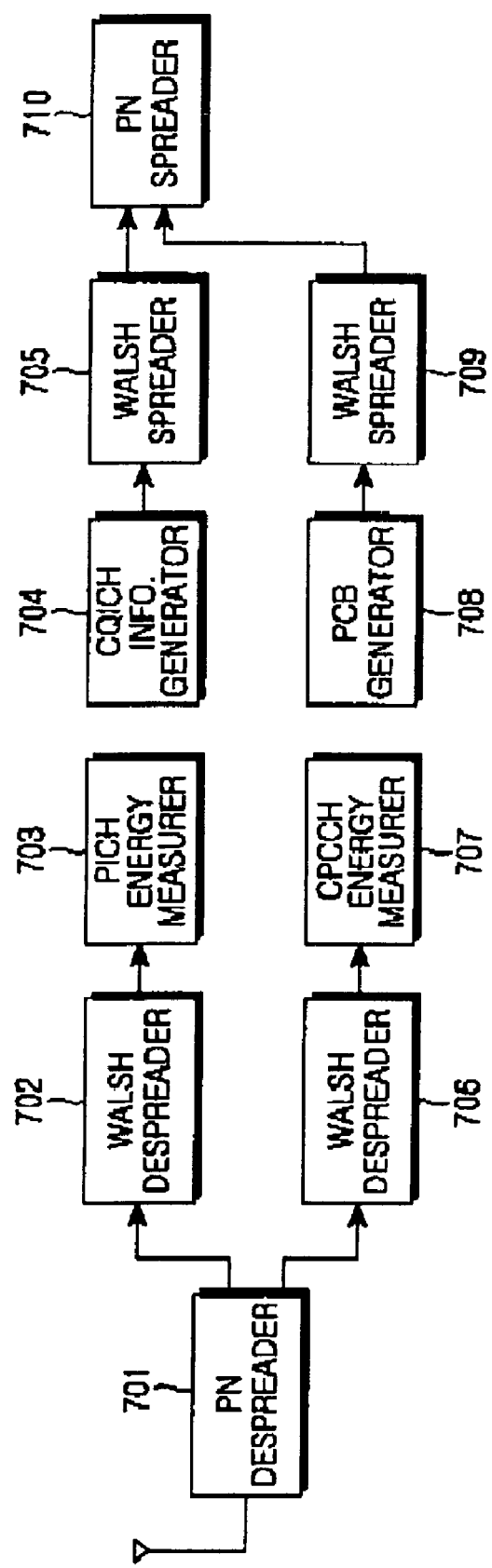
FIG. 7 illustrates a transceiver structure in a mobile for controlling transmission power of a CPCCH according to an embodiment of the present invention.

FIG. 7 illustrates a transceiver structure in a mobile for controlling transmission power of a CPCCH according to an embodiment of the present invention. As illustrated, the mobile includes a PN (Pseudo Noise) despreader 701, Walsh despreaders 702 and 706, a PICH energy measurer 703, a CQICH information generator 704, Walsh spreaders 705 and 709, a CPCCH energy measurer 707, a PCB generator 708, and a PN spreader 710. Among the elements, the PN despreader 701, the Walsh despreaders 702 and 706, the PICH energy measurer 703, and the CPCCH energy measurer 707 constitute a receiver, and the CQICH information generator 704, the PCB generator 708, the Walsh spreaders 705 and 709, and the PN spreader 710 constitute a transmitter.

Referring to FIG. 7, the PN despreader 701 performs a reverse operation of the PN spreading performed in a base station by multiplying a received signal by a given PN code. The Walsh despreader 702 performs a reverse operation of the Walsh spreading performed in the base station by multiplying the PN despread signal from the PN despreader 701 by a Walsh code assigned to a forward pilot channel. The PICH energy measurer 703 measures power of a received pilot channel signal provided from the Walsh despreader 702. Here, the mobile receives pilot channel signals from a plurality of sectors and measures power of each of the received pilot channel signals. The CQICH information generator 704 determines information to be transmitted over the CQICH based on the measured power of the forward PICH, and encodes the determined information. The CQICH information, information indicating a channel condition between a sector and a mobile, includes sector indicator information indicating a best sector that transmitted a forward PICH signal having the highest reception power, and the reception power value C/I. The Walsh spreader 705 performs Walsh spreading on the CQICH by multiplying the coded signal from the CQICH information generator 704 by a given Walsh code.

The Walsh despreader 706 performs a reverse operation of the Walsh spreading performed in the base station by multiplying the PN despread signal from the PN despreader 701 by a Walsh code assigned to a forward CPCCH. The CPCCH energy measurer 707 measures power of corresponding CPCCH symbols from the Walsh despreader 706. Here, the mobile receives CPCCHs from a plurality of sectors and measures power of symbols extracted from the received CPCCHs. The PCB generator 708 generates a PCB based on the measured power values of the CPCCHs, in the above-stated manner. That is, the PCB is information determined according to states of the CPCCH signals received from the sectors. The Walsh spreader 709 performs Walsh spreading on the PCB from the PCB generator 708 and the R-PICH. The PN spreader 710 adds the signals output from the Walsh spreaders 705 and 709, performs PN spreading on the added signal, and transmits the PN spread signal over the CQICH and PICH.

Figure 8:
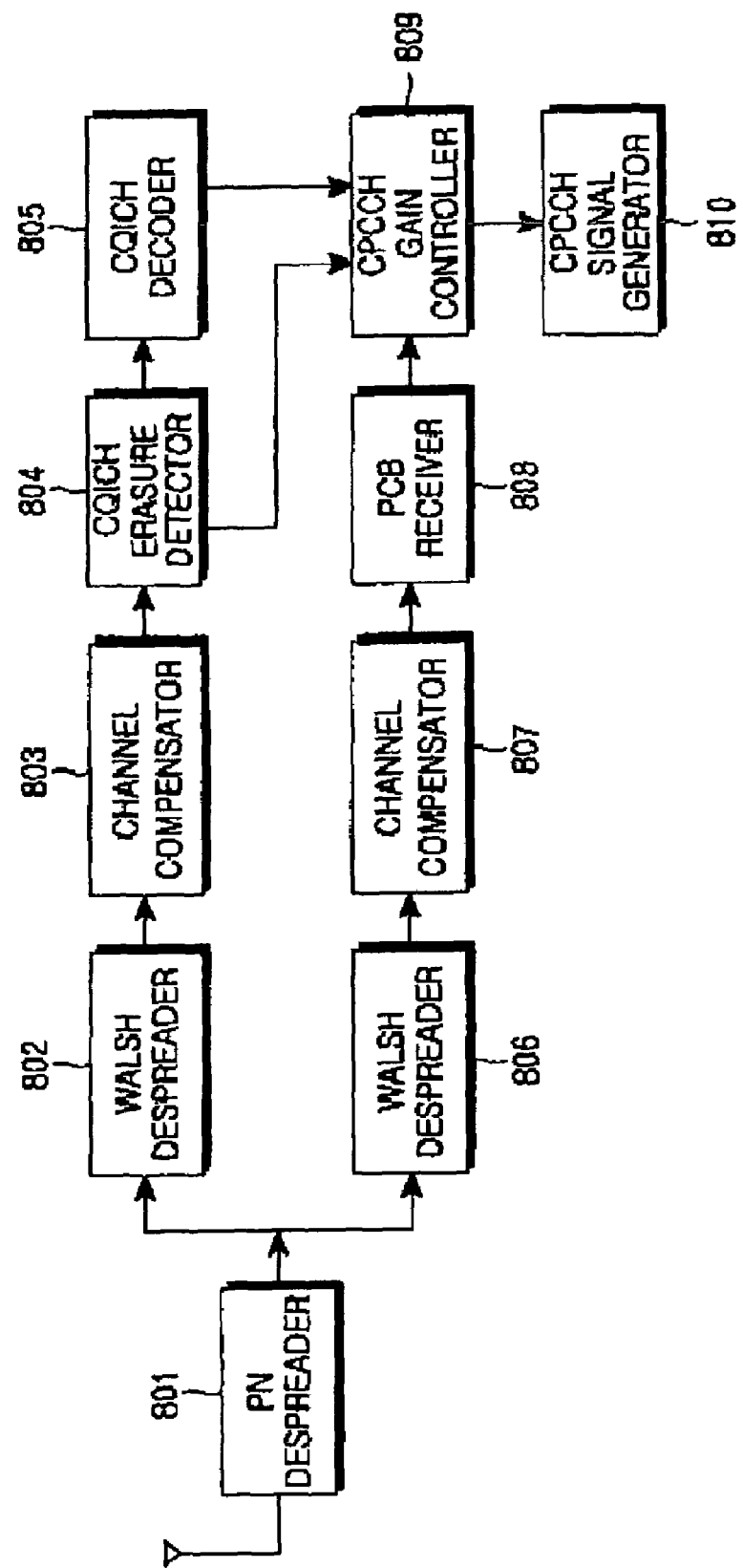
FIG. 8 illustrates a transceiver structure in a sector for controlling transmission power of a CPCCH according to an embodiment of the present invention.

FIG. 8 illustrates a transceiver structure in a sector for controlling transmission power of a CPCCH according to an embodiment of the present invention. As illustrated, the sector includes a PN despreader 801, Walsh despreaders 802 and 806, channel compensators 803 and 807, a CQICH erasure detector 804, a CQICH decoder 805, a PCB receiver 808, a CPCCH gain controller 809, and a CPCCH signal generator 810. Among the elements, the PN despreader 801, the Walsh despreaders 802 and 806, the channel compensators 803 and 807, the CQICH erasure detector 804, the CQICH decoder 805, and the PCB receiver 808 constitute a receiver, and the CPCCH gain controller 809 and the CPCCH signal generator 810 constitute a transmitter. In particular, the CPCCH gain controller 809 servers as a power controller for controlling power of a CPCCH being transmitted to the mobile based on channel condition information received over a CQICH or a PCB received over a PICH.

Referring to FIG. 8, the PN despreader 801 performs a reverse operation of the PN spreading performed in the mobile by multiplying a received signal by a given PN code. The Walsh despreader 802 performs a reverse operation of the Walsh spreading performed in the mobile by multiplying the PN despread signal from the PN despreader 801 by a Walsh code assigned to the CQICH. The channel compensator 803 performs channel compensation on the CQICH by multiplying a CQICH signal from the Walsh despreader 802 by a conjugate signal of a channel estimation signal obtained by estimating a pilot channel. The CQICH erasure detector 804 measures reception energy of the channel-compensated CQICH from the channel estimator 803 and determines whether to perform an erasure process by comparing the measured reception energy with a threshold. The CQICH erasure detector 804, if it determines not to perform an erasure process, provides a CQICH signal from the channel compensator 803 to the CQICH decoder 805. That is, the CQICH erasure detector 804 determines whether the received CQICH can guarantee specified reception performance, based on the energy value included in the CQICH, and provides the result to the CPCCH gain controller 809. The CQICH decoder 805, if the CQICH is not required to undergo an erasure process, restores sector indicator information and a forward C/I value by decoding the CQICH signal, and provides the sector indicator information and the C/I value to the CPCCH gain controller 809.

Meanwhile, the Walsh despreader 806 performs a reverse operation of the Walsh spreading performed in the mobile by multiplying the PN despread signal from the PN despreader 801 by a Walsh code assigned to the pilot channel. The channel compensator 807 performs channel compensation on the pilot channel by multiplying a signal from the Walsh despreader 806 by a conjugate signal of the channel estimation signal. The PCB receiver 808 determines whether the PCB transmitted over a part of the PICH has been received. The CPCCH gain controller 809 determines a gain of CPCCH symbols transmitted to the mobile based on the CQICH erasure information from the CQICH erasure detector 804, the forward C/I value and sector indicator information included in the CQICH from the CQICH decoder 805, and a PCB from the PCB receiver 808. The CPCCH gain controller 809 controls a gain of the CPCCH symbols according to the forward C/I, if the sector indicator information indicates the sector itself. Otherwise, if the sector indicator information does not indicate the sector itself or the erasure process occurs, the CPCCH gain controller 809 controls a gain of the CPCCH symbols according to the PCB. The CPCCH signal generator 810 generates a power-controlled CPCCH signal according to the gain of the CPCCH symbols, determined by the CPCCH gain controller 809.

As described above, in the mobile communication system according to the present invention, the mobile in a soft handoff state transmits, over a pilot channel, a PCB for controlling transmission power of forward CPCCHs from the sectors included in the active set, so even a sector that failed to receive CQICH from the mobile can control transmission power of the forward CPCCH.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling power of common power control channels from a plurality of base stations in order to control transmission power of a mobile station in a mobile communication system including the mobile station and the base stations constituting an active set, comprising the steps of:

receiving, by the mobile station, pilot signals from the base stations and selecting a base station that transmitted a pilot signal having a highest power level;

transmitting to the selected base station, by the mobile station, information indicating a channel condition between the selected base station and the mobile station;

determining a power control bit according to signal strengths received from the base stations, and transmitting the determined power control bit to the base stations;

controlling, by the selected base station, the power of the common power control channel transmitted to the mobile station based on the channel condition; and controlling, by the non-selected base stations, the power of the common power control channels transmitted from non-selected base stations to the mobile station based on the received power control bits.

2. A method for controlling power of common power control channels from a plurality of base stations in order to control transmission power of a mobile station in a mobile communication system including the mobile station and the base stations constituting an active set, comprising the steps of:

receiving, by the mobile station, pilot signals from the base stations and selecting a base station that transmitted a pilot signal having a highest power level;

transmitting, by the mobile station, information indicating a channel condition between the selected base station and the mobile station, over a channel quality indicator channel, determining a power control bit according to signal strengths received from the base stations, and transmitting the determined power control bit to the base stations over a pilot channel;

receiving, by the base stations, the channel quality indicator channel and the pilot channel from the mobile station;

measuring power of the received channel quality indicator channel by the base stations;

controlling, by the selected base station, power of a common power control channel transmitted to the mobile station based on the channel condition information received over the channel quality indicator channel, if the measured power is higher than or equal to a predetermined threshold; and controlling, by the selected base station, power of the common power control channel transmitted to the mobile station based on the power control bit received over the pilot channel, if the measured power is lower than the predetermined threshold.

3. The method of claim 2, further comprising the step of controlling, by the non-selected base stations, power of common power control channels transmitted to the mobile station based on received power control bits.

4. A power control apparatus in a mobile communication system, comprising:
- a mobile station and a plurality of base stations constituting an active set;
- the mobile station including,
  - a receiver for receiving pilot signals from the plurality of base stations and measuring energy of the received pilot signals, and
  - a transmitter for selecting a base station that transmitted a pilot signal having a highest power level among the measured pilot signals, transmitting information indicating a channel condition between the selected base station and the mobile station to the selected base station, determining a power control bit according to state information received from the plurality of base stations, and transmitting the determined power control bit to the base stations;
- the selected base station including,
  - a receiver for receiving the channel condition information from the mobile station, and
  - a power controller for controlling the power of the common power control channel transmitted to the mobile station based on the received channel condition information; and
- the non-selected base stations each including,
  - a receiver for receiving the power control bit from the mobile station, and
  - a power controller for controlling the power of the common power control channel transmitted to the mobile station based on the received power control bit.

5. A power control apparatus in a mobile communication system, comprising:
- a mobile station and a plurality of base stations constituting an active set;
- the mobile station including,
  - a receiver for receiving pilot signals from the plurality of base stations and measuring energy of the received pilot signals, and
  - a transmitter for selecting a base station that transmitted a pilot signal having a highest power level among the measured pilot signals, transmitting information indicating a channel condition between the selected base station and the mobile station to the selected base station over a channel quality indicator channel, determining a power control bit according to state information received from the plurality of base stations, and transmitting the determined power control bit to the plurality of base stations over a pilot channel;
- the selected base station including,
  - a receiver for receiving the channel quality indicator channel and the pilot channel from the mobile station, and
  - a power controller for controlling power of the common power control channel transmitted to the mobile station based on the channel condition information received over the channel quality indicator channel, if power of the received channel quality indicator channel is higher than or equal to a predetermined threshold, and controlling power of the common power control channel transmitted to the mobile station based on the power control bit received over the pilot channel, if power of the received channel quality indicator channel is lower than the predetermined threshold; and
- the non-selected base stations each including,
  - a receiver for receiving the channel quality channel and the pilot channel from the mobile station, and
  - a power controller for controlling power of the common power control channel transmitted to the mobile station based on the power control bit received over the pilot channel.

6. A method for controlling power of forward channels from a plurality of base stations in order to control transmission power of a mobile station in a mobile communication system including the mobile station and the base stations constituting an active set, comprising the steps of:
- receiving, by the mobile station, pilot signals from the base stations and selecting a base station that transmitted a pilot signal having a highest power level;
- transmitting to the selected base station, by the mobile station, information indicating a channel condition between the selected base station and the mobile station;
- determining a power control bit according to signal strengths received from the base stations, and transmitting the determined power control bit to the base stations;
- controlling, by the selected base station, the power of the forward channel transmitted to the mobile station based on the channel condition information; and
- controlling, by the non-selected base stations, the power of the forward channels transmitted from non-selected base stations to the mobile station based on the received power control bits.

7. The method of claim 6, wherein the forward channel is a common power channel.

8. A method for controlling power of forward channels from a plurality of base stations in order to control transmission power of a mobile station in a mobile communication system including the mobile station and the base stations constituting an active set, comprising the steps of:
- receiving, by the mobile station, pilot signals from the base stations and selecting a base station that transmitted a pilot signal having a highest power level;
- transmitting, by the mobile station, information indicating a channel condition between the selected base station and the mobile station, over a channel quality indicator channel, determining a power control bit according to signal strengths received from the base stations, and transmitting the determined power control bit to the base stations over a pilot channel;
- receiving, by the base stations, the channel quality indicator channel and the pilot channel from the mobile station;
- measuring power of the received channel quality indicator channel by the base stations;
- controlling, by the selected base station, power of a forward channel transmitted to the mobile station based on the channel condition information received over the channel quality indicator channel, if the measured power is higher than or equal to a predetermined threshold; and
- controlling, by the selected base station, power of the forward channel transmitted to the mobile station based on the power control bit received over the pilot channel, if the measured power is lower than the predetermined threshold.

9. The method of claim 8, further comprising the step of controlling, by the non-selected base stations, power of forward channels transmitted to the mobile station based on received power control bits.

10. A power control apparatus in a mobile communication system, comprising:
- a mobile station and a plurality of base stations constituting an active set;
- the mobile station including,
  - a receiver for receiving pilot signals from the plurality of base stations and measuring energy of the received pilot signals, and
  - a transmitter for selecting a base station that transmitted a pilot signal having a highest power level among the measured pilot signals, transmitting information indicating a channel condition between the selected base station and the mobile station to the selected base station, determining a power control bit according to state information received from the plurality of base stations, and transmitting the determined power control bit to the base stations;
- the selected base station including,
  - a receiver for receiving the channel condition information from the mobile station, and
  - a power controller for controlling the power of the forward channel transmitted to the mobile station based on the received channel condition information; and
- the non-selected base stations each including,
  - a receiver for receiving the power control bit from the mobile station, and
  - a power controller for controlling the power of the forward channel transmitted to the mobile station based on the received power control bit.

11. A power control apparatus in a mobile communication system, comprising:
- a mobile station and a plurality of base stations constituting an active set;
- the mobile station including,
  - a receiver for receiving pilot signals from the plurality of base stations and measuring energy of the received pilot signals, and
  - a transmitter for selecting a base station that transmitted a pilot signal having a highest power level among the measured pilot signals, transmitting information indicating a channel condition between the selected base station and the mobile station to the selected base station over a channel quality indicator channel, determining a power control bit according to state information received from the plurality of base stations, and transmitting the determined power control bit to the plurality of base stations over a pilot channel;
- the selected base station including,
  - a receiver for receiving the channel quality indicator channel and the pilot channel from the mobile station, and
  - a power controller for controlling power of the forward channel transmitted to the mobile station based on the channel condition information received over the channel quality indicator channel, if power of the received channel quality indicator channel is higher than or equal to a predetermined threshold, and controlling power of the forward channel transmitted to the mobile station based on the power control bit received over the pilot channel, if power of the received channel quality indicator channel is lower than the predetermined threshold; and
- the non-selected base stations each including,
  - a receiver for receiving the channel quality channel and the pilot channel from the mobile station, and
  - a power controller for controlling power of the forward channel transmitted to the mobile station based on the power control bit received over the pilot channel.

* * * * *